(12) United States Patent
Kim

(10) Patent No.: US 10,604,182 B2
(45) Date of Patent: Mar. 31, 2020

(54) APPARATUS AND METHOD FOR CONTROLLING REAR-WHEEL STEERING

(71) Applicant: MANDO CORPORATION, Pyeongtaek-si, Gyeonggi-do (KR)

(72) Inventor: Sang Mook Kim, Suwon-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 135 days.

(21) Appl. No.: 15/698,228

(22) Filed: Sep. 7, 2017

(65) Prior Publication Data
US 2018/0065662 A1 Mar. 8, 2018

(30) Foreign Application Priority Data

Sep. 8, 2016 (KR) .......................... 10-2016-0115830
Aug. 31, 2017 (KR) .......................... 10-2017-0111282

(51) Int. Cl.
*B62D 7/15* (2006.01)
*B62D 7/14* (2006.01)
(Continued)

(52) U.S. Cl.
CPC ............. *B62D 7/159* (2013.01); *B60W 10/20* (2013.01); *B62D 6/002* (2013.01); *B62D 7/14* (2013.01); *B62D 7/1509* (2013.01)

(58) Field of Classification Search
CPC ........ B62D 7/159; B62D 7/1509; B62D 7/14; B62D 7/15
See application file for complete search history.

(56) References Cited

U.S. PATENT DOCUMENTS

| 8,504,243 B2 * | 8/2013 | Kageyama ............. B62D 5/008 180/234 |
| 9,650,069 B2 * | 5/2017 | Jang ....................... B62D 7/159 |
| 2013/0131927 A1 * | 5/2013 | Ishihara ................... B62D 6/00 701/43 |

FOREIGN PATENT DOCUMENTS

| CN | 103121469 A | 5/2013 |
| CN | 104709341 A | 6/2015 |

(Continued)

OTHER PUBLICATIONS

Korean Office Action dated Oct. 5, 2018 issued in Korean Patent Application No. 10-2017-0111282.
(Continued)

*Primary Examiner* — Todd M Melton
(74) *Attorney, Agent, or Firm* — Morgan, Lewis & Bockius LLP

(57) ABSTRACT

The present invention provides a rear-wheel steering control technique. Specifically, a rear-wheel steering control apparatus for controlling rear-wheel steering control, according to an aspect of the present invention, may include: a vehicle data collection unit configured to receive vehicle data including at least one of steering angle data, steering torque data, vehicle speed data, yaw rate data, or lateral acceleration data; a vehicle data determination unit configured to determine whether or not the steering angle data included in the vehicle data is normal; and a rear-wheel steering control unit configured to generate a rear-wheel steering control signal for degradation rear-wheel control based on at least one of the steering torque data, the vehicle speed data, the yaw rate data, or the lateral acceleration data when the steering angle data is determined to be abnormal.

12 Claims, 10 Drawing Sheets

(51) Int. Cl.
*B60W 10/20* (2006.01)
*B62D 6/00* (2006.01)

(56) References Cited

FOREIGN PATENT DOCUMENTS

| | | | |
|---|---|---|---|
| CN | 105083374 | A | 11/2015 |
| CN | 105209324 | A | 12/2015 |
| CN | 105523081 | A | 4/2016 |
| JP | 2004-237927 | A | 8/2004 |
| JP | 5320292 | B2 | 10/2013 |
| JP | 2014-004920 | A | 1/2014 |

OTHER PUBLICATIONS

Office Action issued in Chinese Patent Application No. 201710804073.X dated Jul. 22, 2019.

* cited by examiner

Step Input : u(t)

First-order derivative time element
(derivative time element, the derivative lag element)

Secondary system control
(Mass-Spring Damper)

APPARATUS AND METHOD FOR CONTROLLING REAR-WHEEL STEERING

CROSS REFERENCE TO RELATED APPLICATION

This application claims priority from Korean Patent Application Nos. 10-2016-0115830, filed on Sep. 8, 2016 and 10-2017-0111282, filed on Aug. 31, 2017, which is hereby incorporated by reference for all purposes as if fully set forth herein.

BACKGROUND OF THE INVENTION

1. Field of the Invention

The present invention relates to a rear-wheel steering control technique, and more particularly, to a technique for enabling rear-wheel steering control even when a vehicle sensor malfunctions.

2. Description of the Prior Art

Vehicles adopt a four-wheel steering system to improve the maneuverability of a large-sized vehicle by reducing a turning radius during low-speed turning thereof through the reverse-phase control of a rear-wheel steering direction (relative to a front-wheel steering direction), and to improve the stability of a vehicle by reducing the yaw rate, side slip, or the like thereof during high-speed turning thereof through same-phase control of a rear-wheel steering direction (relative to a front-wheel steering direction). A typical four-wheel steering system operates based on steering angle information from a driver. Therefore, the general four-wheel steering system does not control the rear-wheel steering angle when the steering angle information of a driver is determined to be abnormal. In this case, the avoidance function of a vehicle may be impeded in an emergency situation.

SUMMARY OF THE INVENTION

An objective of the present invention is to provide a rear-wheel steering control technique.

In addition, another objective of the present invention is to provide a technique for enabling rear-wheel steering even when vehicle sensors malfunction.

In addition, another objective of the present invention is to provide a technique for enabling stable rear-wheel steering when a steering angle sensor malfunctions.

Furthermore, another objective of the present invention is to provide a technique for enabling rear-wheel steering based on steering torque when a steering angle sensor malfunctions.

According to an aspect of the present invention, there is provided a rear-wheel steering control apparatus comprising: a vehicle data collection unit configured to receive vehicle data including at least one of steering angle data, steering torque data, vehicle speed data, yaw rate data, or lateral acceleration data; a vehicle data determination unit configured to determine whether or not the steering angle data included in the vehicle data is normal; and a rear-wheel steering control unit configured to generate a rear-wheel steering control signal for degradation rear-wheel control based on at least one of the steering torque data, the vehicle speed data, the yaw rate data, or the lateral acceleration data when the steering angle data is determined to be abnormal.

In addition, according to another aspect of the present invention, there is provided a rear-wheel steering control method comprising: receiving vehicle data including at least one of steering angle data, steering torque data, vehicle speed data, yaw rate data, or lateral acceleration data; determining whether or not the steering angle data included in the vehicle data is normal; and generating a rear-wheel steering control signal for degraded rear-wheel control based on at least one of the steering torque data, the vehicle speed data, the yaw rate data, or the lateral acceleration data when the steering angle data is determined to be abnormal.

According to an embodiment of the present invention, it is possible to steer rear wheels.

In addition, according to another embodiment of the present invention, it is possible to steer rear wheels even when vehicle sensors malfunction.

In addition, according to another embodiment of the present invention, it is possible to stably steer rear wheels when a steering angle sensor malfunctions.

Further, according to another embodiment of the present invention, it is possible to steer rear wheels based on steering torque when a steering angle sensor malfunctions.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
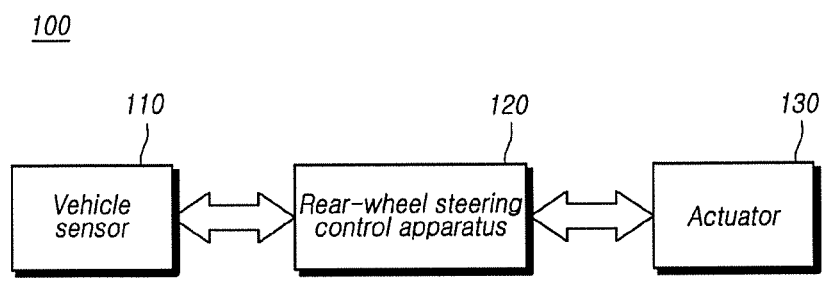
FIG. 1 is a configuration diagram of a rear-wheel steering system, according to an embodiment of the present invention.

The present invention may have various modifications and embodiments, and thus particular embodiments illustrated in the drawings will be described in detail in the following description. However, it should be understood that the present invention is not limited to the specific embodiments, but the present invention includes all modifications, equivalents, and alternatives within the spirit and the scope of the present invention. Further, in the description of the present invention, when it is determined that the detailed description of the related well-known technologies unnecessarily make the subject matter of the present invention unclear, the detailed description will be omitted. A singular expression as used in the specification and the claims should be construed as meaning "one or more" unless indicated otherwise.

Hereinafter, embodiments of the present invention will be described in detail with reference to the accompanying drawings, and in the description with reference to the accompanying drawings, the same or corresponding components have the same reference numeral, and a duplicate description therefor will be omitted.

FIG. 1 is a configuration diagram of a rear-wheel steering system, according to an embodiment of the present invention.

Referring to FIG. 1, a rear-wheel steering system 100 may include a vehicle sensor 110, a rear-wheel steering control apparatus 120, and an actuator 130.

The vehicle sensor 110 generates vehicle data. More specifically, the vehicle sensor 110 may receive vehicle data including vehicle speed data, steering angle data, yaw rate data, lateral acceleration data, steering torque data, and the like. The vehicle sensor 110 may transmit the generated vehicle data to the rear-wheel steering control apparatus 120. Here, the steering angle data may refer to information on angles depending on the driver's steering, and may include a steering direction and angle information. The yaw rate data may refer to the speed at which the rotational angle changes around a vertical line passing through the center of the vehicle, and may include the magnitude thereof and the amount of change thereof. The vehicle speed data may refer to moving-speed information of the vehicle. The steering torque data may refer to torque information depending on the driver's steering, and may include the magnitude of torque and the amount of change in the torque. The lateral acceleration data may refer to acceleration acting in the lateral direction of a turning vehicle.

In an embodiment, the vehicle sensor 110 may be at least one sensor that generates vehicle data. For example, the vehicle sensor 110 may be a sensor that generates vehicle speed data that can be used for the rear-wheel steering control, such as a vehicle speed sensor for generating vehicle speed data, a steering angle sensor for generating steering angle data, a yaw rate sensor for generating yaw rate data, a lateral-acceleration sensor for generating lateral acceleration data, or a steering torque sensor for generating steering torque data.

The rear-wheel steering control apparatus 120 controls the rear-wheel steering. More specifically, the rear-wheel steering control apparatus 120 may receive the vehicle data. The rear-wheel steering control apparatus 120 may generate a rear-wheel steering control signal for the rear-wheel steering control based on the received vehicle data. The rear-wheel steering control apparatus 120 may transmit the generated rear-wheel steering control signal to the actuator 130.

In addition, the rear-wheel steering control apparatus 120 may determine whether or not the vehicle data is normal. More specifically, the rear-wheel steering control apparatus 120 may determine whether or not the vehicle data, such as the vehicle speed data, the steering angle data, the yaw rate data, the lateral acceleration data, or the steering torque data, which is received from the vehicle sensor unit, is normal.

In addition, the rear-wheel steering control apparatus 120 may generate a rear-wheel steering control signal for controlling the rear-wheel steering based on vehicle data excluding vehicle data that has been determined to be abnormal. Here, the rear-wheel steering control signal may include information, such as the steering angle of rear wheels, the steering direction thereof, and the like, which can be used by the actuator 130 to steer the rear wheels.

In an embodiment, the rear-wheel steering control apparatus 120 may generate a rear-wheel steering control signal in the form of feed-forward control or feedback control.

In an embodiment, when the vehicle speed data is normal, the rear-wheel steering control apparatus 120 may generate a rear-wheel steering control signal including a steering direction, which is determined based on the vehicle speed data.

In addition, the rear-wheel steering control apparatus 120 may determine the state of the rear-wheel steering system 100. More specifically, the rear-wheel steering control apparatus 120 may determine whether or not the rear-wheel steering system 100 is operating normally. If the rear-wheel steering system 100 is not operating normally, the rear-wheel steering control apparatus 120 may not control the rear-wheel steering. Here, the case in which the rear-wheel steering system 100 is not operating normally may include a failure state other than the abnormal state of the vehicle speed data, such as the case in which the actuator 130 is not performing the rear-wheel steering according to the rear-wheel steering control signal.

The actuator 130 steers the rear wheels. More specifically, the actuator 130 may receive the rear-wheel steering control signal from the rear-wheel steering control apparatus 120. The actuator 130 may steer the rear wheels based on the received rear-wheel steering control signal.

In addition, the vehicle sensor 110, the rear-wheel steering control apparatus 120, and the actuator 130, which constitute the rear-wheel steering system 100, may be interconnected based on a wired/wireless communication method. For example, the wired/wireless communication method may be CAN (Controller Area Network) communication.

Hereinafter, the rear-wheel steering control apparatus 120 will be described in detail with reference to FIGS. 2 to 10.

Figure 2:
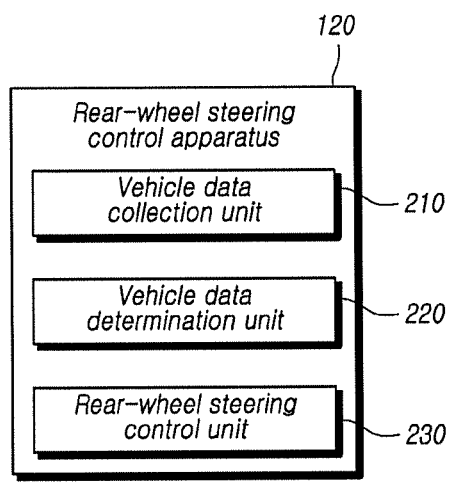
FIG. 2 is a block diagram of a rear-wheel steering control apparatus, according to an embodiment of the present invention.

FIG. 2 is a block diagram of a rear-wheel steering control apparatus, according to an embodiment of the present invention.

Referring to FIG. 2, the rear-wheel steering control apparatus 120 may include a vehicle data collection unit 210, a vehicle data determination unit 220, and a rear-wheel steering control unit 230.

The vehicle data collection unit 210 collects vehicle data. More specifically, the vehicle data collection unit 210 may receive vehicle data including steering angle data, vehicle speed data, yaw rate data, steering torque data, lateral acceleration data, and the like from the vehicle sensor 110. The vehicle data collection unit 210 may store the received vehicle data.

The vehicle data determination unit 220 determines whether or not the vehicle data is normal. More specifically, the vehicle data determination unit 220 may determine whether or not the vehicle data including the steering angle data, the vehicle speed data, the yaw rate data, the lateral acceleration data, the steering torque data, and the like, which are collected from the vehicle sensor 110, is normal.

In an embodiment, the vehicle data determination unit 220 may compare the vehicle data with each other, and may determine whether or not the vehicle data is normal. For example, the vehicle data determination unit 220 may determine whether or not the received steering angle data is normal based on at least one of the yaw rate data and the lateral acceleration data. In an embodiment, the vehicle data determination unit 220 may determine whether or not the vehicle data is normal based on a predetermined value. For example, the vehicle data determination unit 220 may determine whether or not the received steering angle data is normal based on steering angle data that is predetermined through experimental data or the like. At this time, if the difference between the received steering angle data and the predetermined steering angle data is within a predetermined error range, the vehicle data determination unit 220 may determine the received steering angle data to be normal.

In an embodiment, the vehicle data determination unit 220 may determine whether the vehicle data is normal based on a comparison of the vehicle data and based on a predetermined value. For example, the vehicle data determination unit 220 may determine whether or not the received steering angle data is normal based on at least one of the yaw rate data or the lateral acceleration data and based on steering angle data that is predetermined through experimental data or the like.

The above-described method of determining whether or not the vehicle data is normal is disclosed only as an example. Thus, it is obvious that methods of determining whether or not the vehicle data is normal other than the above-described method are also included in the scope of the present invention.

The rear-wheel steering control unit 230 generates a rear-wheel steering control signal. More specifically, the rear-wheel steering control unit 230 may determine a steering angle, a steering direction, and the like of rear wheels based on the vehicle data. The rear-wheel steering control unit 230 may generate a rear-wheel steering control signal including information that can be used for rear-wheel steering control based on the determined steering angle and steering direction of the rear wheels. The rear-wheel steering control unit 230 may transmit the generated rear-wheel steering control signal to the actuator 130.

In an embodiment, the rear-wheel steering control unit 230 may generate a rear-wheel steering control signal in the form of feed-forward control. For example, the rear-wheel steering control unit 230 may generate a rear-wheel steering control signal for feed-forward control for controlling the rear-wheel steering by taking some or all of the vehicle data as forward inputs. As a specific example, the rear-wheel steering control unit 230 may generate a rear-wheel steering control signal that takes at least one of the steering angle data, the vehicle speed data, the yaw rate data, and the steering torque data as an input.

In an embodiment, the rear-wheel steering control unit 230 may generate a rear-wheel steering control signal in the form of feedback control. For example, the rear-wheel steering control unit 230 may generate a rear-wheel steering control signal for feedback control for controlling the rear-wheel steering by taking some vehicle data as forward inputs and by taking other vehicle data as feedback inputs. As a specific example, the rear-wheel steering control unit 230 may generate a rear-wheel steering signal to steer the rear wheels by taking at least one of the steering angle data, the vehicle speed data, or the steering torque data as a forward input and by taking at least one of the yaw rate data or the lateral acceleration data as a feedback input.

In an embodiment, the rear-wheel steering control unit 230 may determine a rear-wheel steering direction based on the vehicle speed data. For example, the rear-wheel steering control unit 230 may determine a rear-wheel steering direction by controlling the rear-wheel steering direction in the same phase or reverse phase with respect to the front wheels based on the vehicle speed contained in the vehicle speed data. As a specific example, the rear-wheel steering control unit 230 may generate a rear-wheel steering control signal for controlling the rear-wheel steering direction in the reverse phase with respect to the front wheels when driving the vehicle at a high speed and for controlling the rear-wheel steering direction in the same phase as the front wheels when driving the vehicle at a low speed.

In an embodiment, the rear-wheel steering control unit 230 may generate a first rear-wheel steering control signal. For example, the rear-wheel steering control unit 230 may generate a first rear-wheel steering control signal based on the steering angle data when the steering angle data is normal. At this time, the rear-wheel steering control unit 230 may generate the first rear-wheel steering control signal so as to further include at least one of the steering torque data, the yaw rate data, the vehicle speed data, and the lateral acceleration data.

In an embodiment, the rear-wheel steering control unit 230 may generate a second rear-wheel steering control signal. More specifically, the rear-wheel steering control unit 230 may generate a second rear-wheel steering control signal only when at least one of the steering angle data, the yaw rate data, or the vehicle speed data is abnormal. For example, when the steering angle data is abnormal but the yaw rate data and the vehicle speed data are normal, the rear-wheel steering control unit 230 may generate a second rear-wheel steering control signal for yaw-damping control to attenuate a yaw rate change based on the yaw rate data. At this time, the rear-wheel steering control unit 230 may generate the second rear-wheel steering control signal so as to further include the vehicle speed data. In addition, if the amount of yaw rate change included in the yaw rate data is greater than a predetermined amount of yaw rate change, the rear-wheel steering control unit 230 may generate a second rear-wheel steering control signal for yaw-damping control to attenuate a yaw rate change based on the yaw rate data. In another example, when at least two of the steering angle data, the yaw rate data, or the vehicle speed data are abnormal, the rear-wheel steering control unit 230 may generate a second rear-wheel steering control signal in order not to perform the rear-wheel steering.

In an embodiment, the rear-wheel steering control unit 230 may generate a third steering control signal. For example, when one of the steering angle data, the yaw rate data, or the vehicle speed data is abnormal, the rear-wheel steering control unit 230 may generate a third rear-wheel steering control signal for yaw-boosting control to increase a yaw rate change based on the steering torque data. At this time, the rear-wheel steering control unit 230 may generate the third rear-wheel steering control signal so as to further include at least one of the vehicle speed data, the yaw rate data, or the lateral acceleration data. In addition, when at least one of the magnitude of steering torque or the amount of change in the steering torque, which is included in the steering torque data, is greater than a predetermined magnitude of steering torque or a predetermined amount of change in the steering torque, the rear-wheel steering control unit 230 may generate a third rear-wheel steering control signal for yaw-boosting control to increase a yaw rate change based on the steering torque data. However, when the vehicle speed data among the steering angle data, the vehicle speed data, and the yaw rate data is abnormal, the rear-wheel steering control unit 230 may generate a third rear-wheel steering control signal in order not to control rear-wheel steering. In another example, when the yaw rate data among the steering angle data, the yaw rate data, and the vehicle speed data is abnormal, the rear-wheel steering control unit 230 may generate the third rear-wheel steering control signal based on one of either the steering angle data or the vehicle speed data.

The rear-wheel steering control unit 230 may generate a fourth rear-wheel steering control signal. More specifically, when the steering angle data and the steering torque data are abnormal, the rear-wheel steering control unit 230 may generate a fourth rear-wheel steering control signal in order not to control rear-wheel steering.

The first, second, third, and fourth rear-wheel steering control signals described above are disclosed only as examples of rear-wheel steering control signals that are generated by the rear-wheel steering control unit. Thus, it will be obvious that rear-wheel steering control signals other than the above are included in the rear-wheel steering control signals generated by the rear-wheel steering control unit.

In addition, the rear-wheel steering control unit 230 may inform the driver of the state of the rear-wheel steering system 100. More specifically, the rear-wheel steering control apparatus 120 may generate signals to inform the driver of the case where the rear-wheel steering system 100 is not operating normally, the case where rear-wheel steering is performed while some vehicle data is in an abnormal state, or the case where rear-wheel steering is performed while the vehicle data is in a normal state.

In an embodiment, the signal to be provided to the driver may be means, such as a warning light, a warning sound, an indication on the display device, a vibration, or the like, which can be recognized visually, auditorily, or tactually by the driver.

Figure 3:
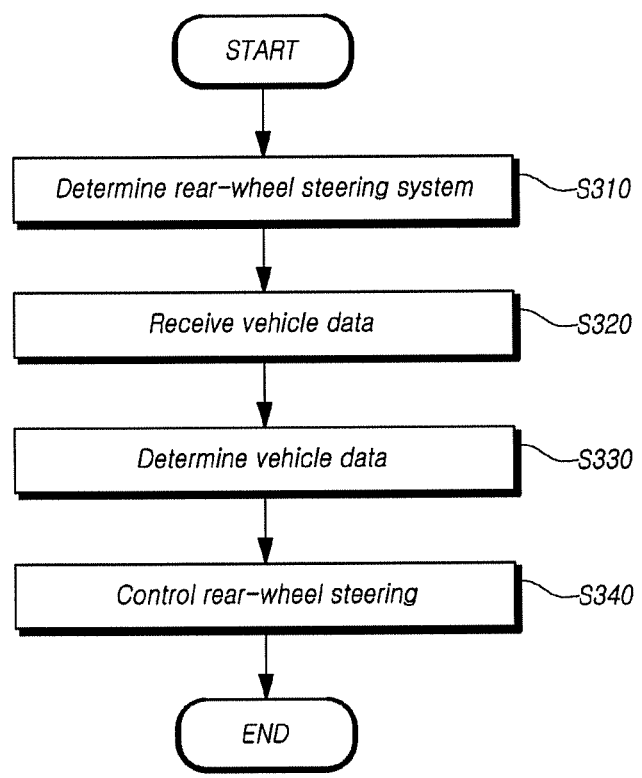
FIG. 3 is a flowchart of a rear-wheel steering control method, according to an embodiment of the present invention.

FIG. 3 is a flowchart of a rear-wheel steering control method, according to an embodiment of the present invention.

Hereinafter, the method will be described with reference to an example performed by the rear-wheel steering control apparatus 120 shown in FIG. 1.

Referring to FIG. 3, in step S310, it is determined whether or not the rear-wheel steering system 100 is operating normally. More specifically, the rear-wheel steering control apparatus 120 may determine whether or not the rear-wheel steering system 100 is operating normally. In addition, if the rear-wheel steering system 100 is determined to be abnormal, the rear-wheel steering control apparatus 120 may generate a rear-wheel control signal in order not to control the rear-wheel steering.

In step S320, vehicle data is received. More specifically, the rear-wheel steering control apparatus 120 may receive vehicle data including steering angle data, vehicle speed data, yaw rate data, lateral acceleration data, steering torque data, and the like. In addition, the rear-wheel steering control apparatus 120 may store the received vehicle data.

In step S330, it is determined whether or not the vehicle data is normal. More specifically, the rear-wheel steering control apparatus 120 may determine whether or not the received vehicle data including the steering angle data, the vehicle speed data, the yaw rate data, the lateral acceleration data, the steering torque data, and the like is normal.

In step S340, the rear-wheel steering is controlled. More specifically, the rear-wheel steering control apparatus 120 may generate a rear-wheel steering control signal including information such as a steering angle and steering direction of the rear wheels, which can be used for the rear-wheel steering control, based on the vehicle data other than the vehicle data that has been determined to be abnormal. The rear-wheel steering control apparatus 120 may transmit the generated rear-wheel steering control signal to the actuator 130. At this time, the actuator 130 may steer rear wheels based on the rear-wheel steering control signal that is received from the rear-wheel steering control apparatus 120.

In addition, the respective steps illustrated in FIG. 3 are not limited to the above-described sequence, and thus one step may be performed at the same time as, or prior to, another step.

Figure 4:
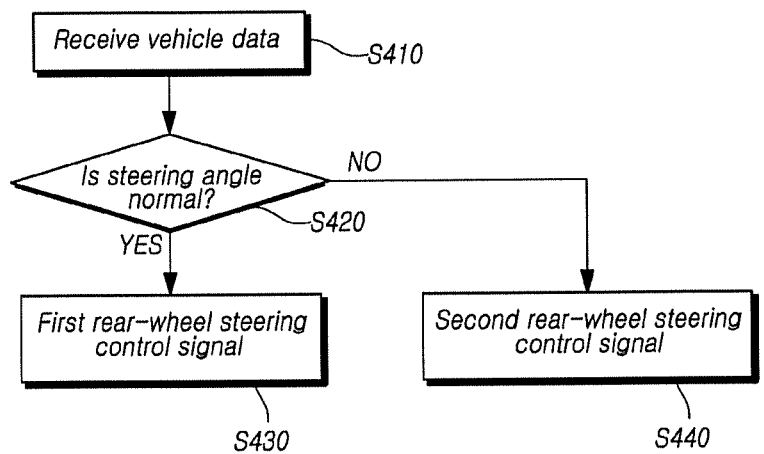
FIG. 4 is a flowchart of a rear-wheel steering control method, according to another embodiment of the present invention.

FIG. 4 is a flowchart of a rear-wheel steering control method, according to another embodiment of the present invention.

Hereinafter, the method will be described with reference to an example that is performed by the rear-wheel steering control apparatus 120 shown in FIG. 1. In addition, the step S310 shown in FIG. 3 may be included in the method shown in FIG. 4, and since step S410 is equal to step S320 shown in FIG. 3, the detailed description of step S320 may be applied thereto. Referring to FIG. 4, it is determined whether or not the steering angle data is normal in step S420. More specifically, the rear-wheel steering control apparatus 120 may determine whether or not the received steering angle data is normal.

In step S430, a first rear-wheel steering control signal is generated. More specifically, when the steering angle data is determined to be normal, the rear-wheel steering control apparatus 120 may generate a first rear-wheel control signal based on the steering angle data.

In step S440, a second rear-wheel steering control signal is generated. More specifically, when the steering angle data is determined to be abnormal, the rear-wheel steering control unit 230 may generate a second rear-wheel steering control signal based on the vehicle data excluding the steering angle data.

In addition, the respective steps illustrated in FIG. 4 are not limited to the above-described sequence, and thus one step may be performed at the same time as, or prior to, another step.

Figure 5:
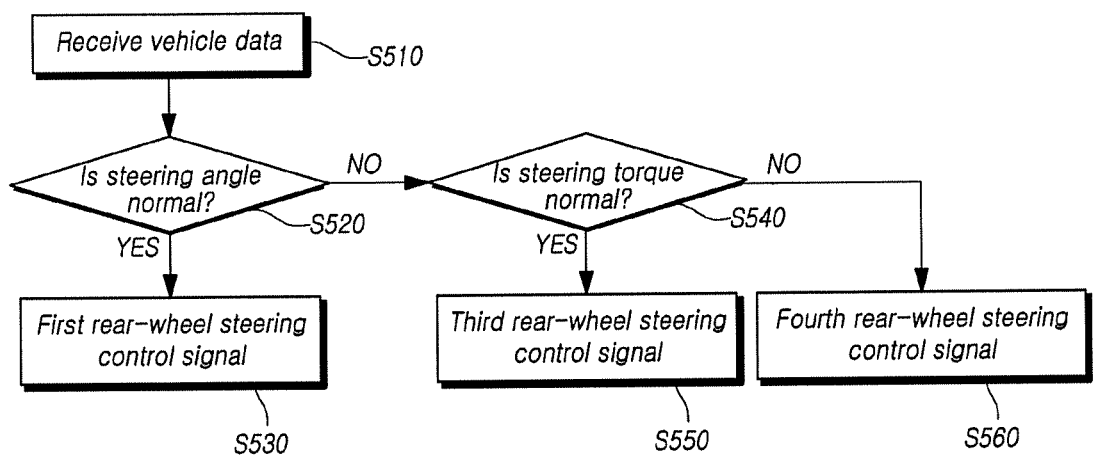
FIG. 5 is a flowchart of a rear-wheel steering control method, according to still another embodiment of the present invention.

FIG. 5 is a flowchart of a rear-wheel steering control method, according to another embodiment of the present invention.

Hereinafter, the method will be described with reference to an example that is performed by the rear-wheel steering control apparatus 120 shown in FIG. 1. In addition, the step S310 shown in FIG. 3 may be included in the method shown in FIG. 5, and since step S510 is equal to the step S320 shown in FIG. 3, the detailed description of the step S320 may be applied thereto.

Referring to FIG. 5, it is determined whether or not the steering angle data is normal in step S520. More specifically, the rear-wheel steering control apparatus 120 may determine whether or not the received steering angle data is normal.

In step S530, a first rear-wheel steering control signal is generated. More specifically, when the steering angle data is abnormal, the rear-wheel steering control apparatus 120 may generate a first rear-wheel steering control signal based on the vehicle data excluding the steering angle data.

In step S540, it is determined whether or not the steering torque data is normal. More specifically, the rear-wheel steering control apparatus 120 may determine whether or not the steering torque data is normal based on at least one of other vehicle data or an experimentally predetermined value.

In step S550, a third rear-wheel steering control signal is generated. More specifically, when the steering angle data is abnormal but the steering torque data is normal, the rear-wheel steering control apparatus 120 may generate a third rear-wheel steering control signal based on the steering torque data.

In step S560, a fourth rear-wheel steering control signal is generated. More specifically, when the steering angle data and steering torque data are abnormal, the rear-wheel steering control apparatus 120 may generate a fourth rear-wheel steering control signal based on other vehicle data.

Figure 6:
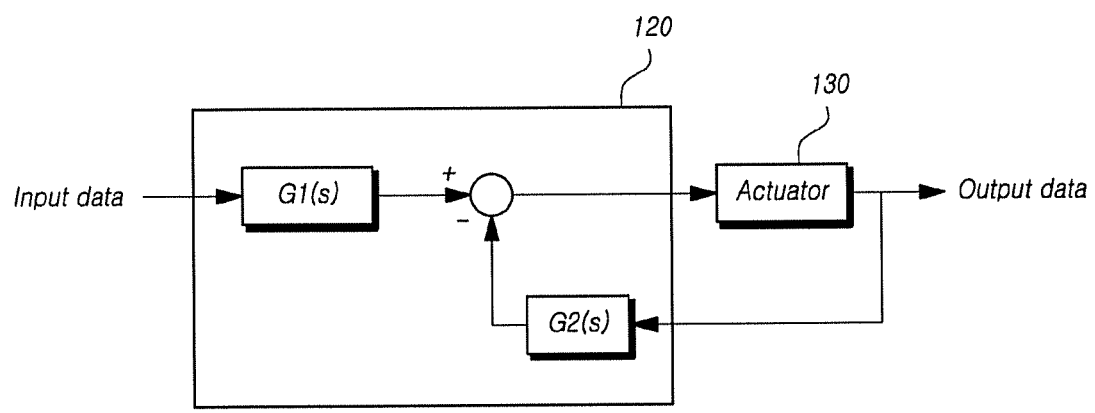
FIG. 6 is a view for explaining an example of feedback control, according to an embodiment of the present invention.

FIG. 6 is a view for explaining an example of feedback control, according to an embodiment of the present invention.

FIG. 6 illustrates an example of feedback control in which the rear-wheel steering control apparatus 120 steers rear wheels by taking input data as a forward input and by taking output data as a feedback input. Here, the input data may refer to the vehicle data at the first time (T1) and the output data may refer to the vehicle data at the second time (T1+T2). More specifically, the rear-wheel steering control apparatus 120 may receive the input data in order to thereby generate the first control amount, and may receive the output data in order to thereby generate the second control amount. The rear-wheel steering control apparatus 120 may generate a rear-wheel steering control signal by calculating the first control amount and the second control amount. The rear-wheel steering control apparatus 120 may transmit the generated rear-wheel steering control signal to the actuator 130. A specific example of generating the control amount, such as the first control amount or the second control amount, will be described with reference to FIGS. 6 to 8.

Figure 7:
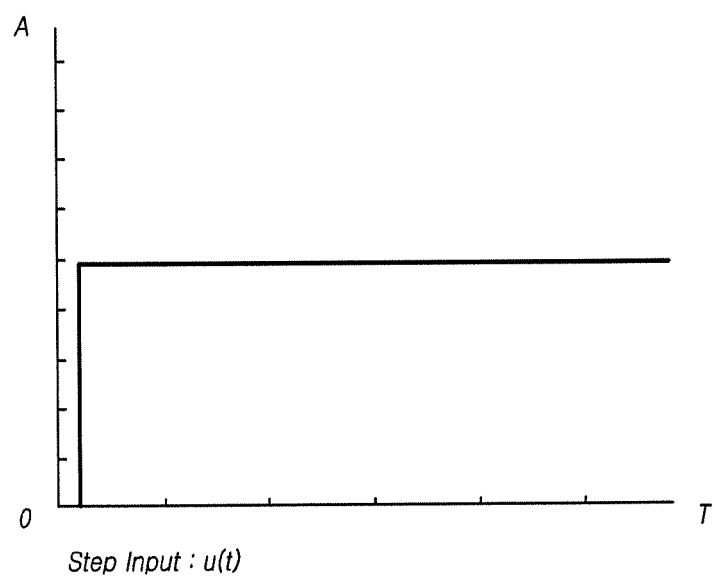
FIGS. 7 to 9 are views for explaining an example of generating a control amount, according to an embodiment of the present invention.
Figure 8:
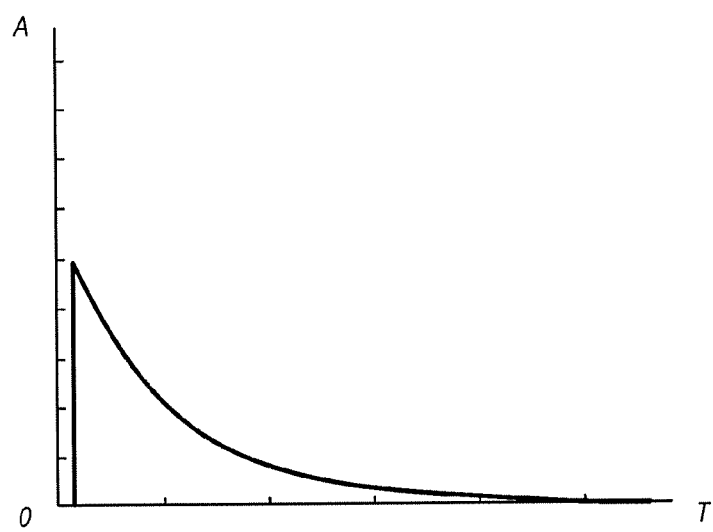
Figure 9:
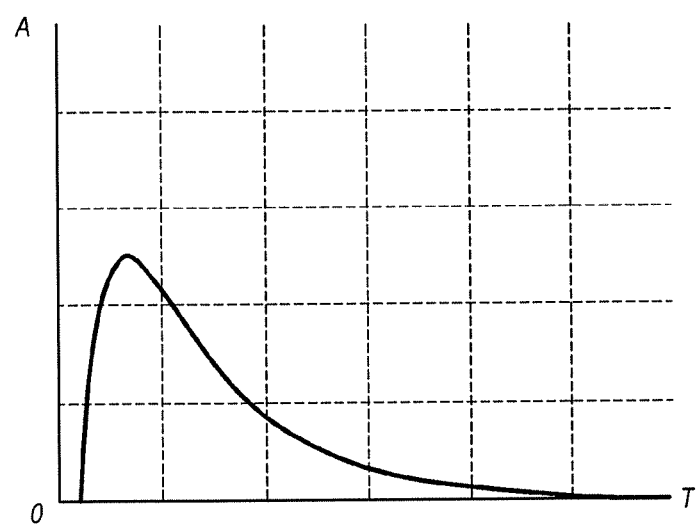

In addition, it is obvious that the method shown in FIGS. 7 to 9 can be applied to the feed-forward control when the rear-wheel steering control apparatus 120 generates the rear-wheel steering control signal only by means of the first control amount.

FIGS. 7 to 9 are views for explaining an example of generating the control amount, according to an embodiment of the present invention.

Referring to the drawings, FIG. 7 is a diagram showing vehicle data in the form of a step input, and FIG. 8 is a diagram showing the first-order derivative time element (derivative lag element) resulting from differentiation of the vehicle data shown in FIG. 7. In addition, FIG. 9 is a diagram showing the result of secondary system control with respect to the first-order derivative time element shown in FIG. 8.

The first-order derivative time element shown in FIG. 8 may be obtained through a system having the characteristics of Equation 1.

$$\rho_1(s) = \frac{s}{1+s/\varepsilon} Y(s) = \Delta(s)Y(s))$$ [Equation 1]

Y(s): vehicle data
$\rho_1(s)$: excitation of system
$\varepsilon$: 1/T (time constant)

The result of the secondary system control shown in FIG. 9 may be obtained through a system having the characteristics of Equation 2. In an embodiment, the secondary system control may be implemented as a Mass-Spring Damper (MSD), a Resistor-Inductor-Capacitor (RLC), or the like.

$$M_1(s) = \frac{\lambda_1(s)}{\rho_1(s)} = \frac{k_1}{s^2 + \vartheta_1 s + k_1}$$ [Equation 2]

$M_1(s)$: Transfer Function
$\rho_1(s)$: excitation of system
$\lambda_1(s)$: travel of mass (=δr or −δr)
$K_1$: normalized spring constant
$\theta_1$: normalized damper constant Here, the control amount may be used to determine the steering angle of rear wheels.

Figure 10:
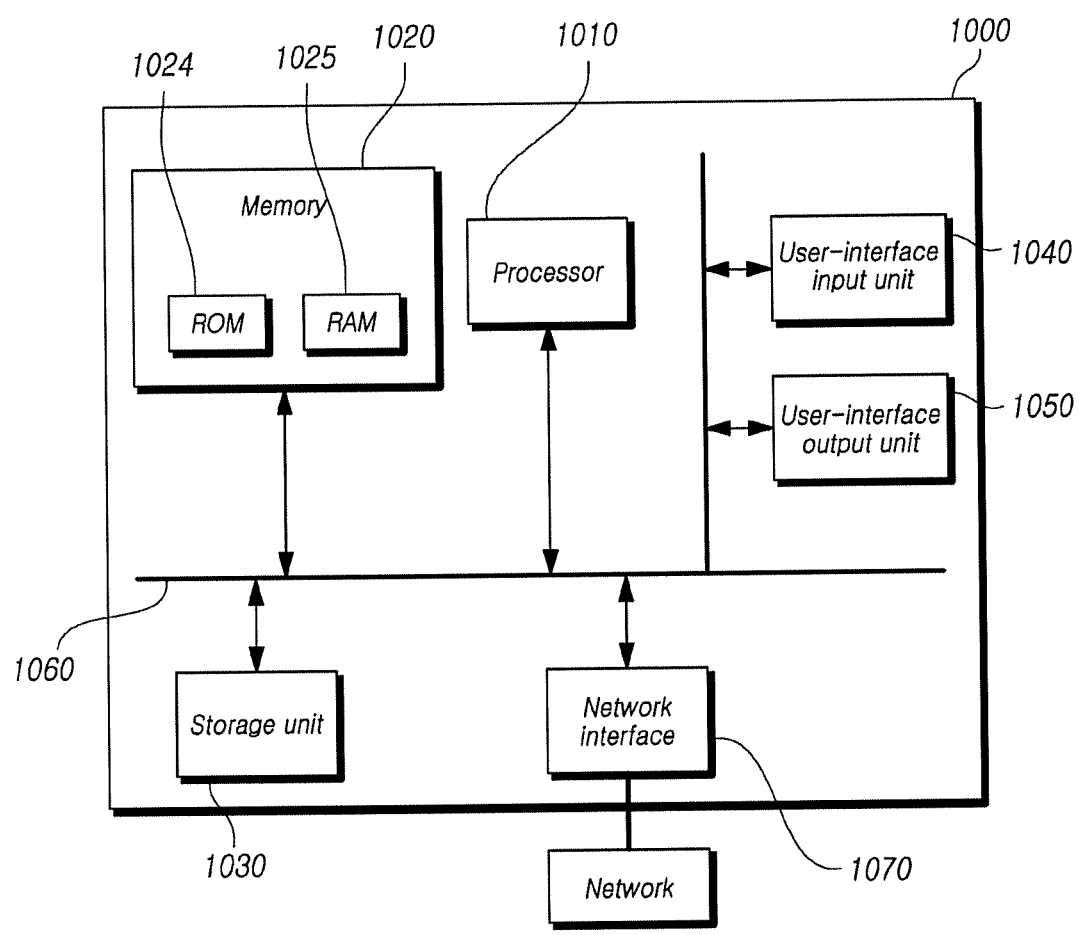
FIG. 10 is a block diagram of a rear-wheel steering control apparatus, according to another embodiment of the present invention.

FIG. 10 is a block diagram of a rear-wheel steering control apparatus, according to another embodiment of the present invention.

The above-described embodiments of the present invention, for example, may be implemented by means of a computer-readable recording medium in a computer system. As shown in FIG. 10, a computer system 1000, such as the rear-wheel steering control apparatus 120, may include at least one of a processor 1010, a memory 1020, a storage unit 1030, a user-interface input unit 1040, or a user-interface output unit 1050, which may communicate with each other through a bus 1060. In addition, the computer system 1000 may include a network interface 1070 for connecting to a network. The processor 1010 may be a CPU or a semiconductor device that executes processing instructions stored in the memory 1020 and/or the storage unit 1030. The memory 1020 and the storage unit 1030 may include various types of volatile/non-volatile recording media. For example, the memory may include a ROM 1024 and a RAM 1025.

Accordingly, embodiments of the present invention may be embodied in a computer-implemented method or in a non-volatile computer-recording medium that stores computer-executable instructions. The instructions, when executed by a processor, may perform the method according to at least one embodiment of the present invention.

The apparatus and method according to the exemplary embodiments of the present invention may be in a form of program commands executed through various computer means to be recorded in a computer readable medium. The computer readable medium may include a program command, a data file, a data structure, and the like independently or in combination.

The program command recorded in the computer-readable medium may be things specially designed and configured for the present invention, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. The computer-readable recording media may be transmission media such as light, a metal wire, or a waveguide including a carrier for carrying a signal designating program instructions, data structures, and the like. Examples of the program command include a machine language code generated by a compiler and a high-level language code executable by a computer through an interpreter and the like.

The aforementioned hardware device may be configured to operate as one or more software modules in order to perform the operation of the present invention, and vice versa.

The present invention has been described above in connection with the embodiments thereof. It will be understood by those skilled in the art to which the present invention belongs that the present invention may be implemented in modified forms without departing from the essential characteristics of the present invention. Therefore, the embodiments disclosed herein should be considered from an illustrative point of view, rather than a limitative point of view. The scope of the present invention is found not in the above description but in the accompanying claims, and all differences falling within the scope equivalent to the claims should be construed as being included in the present invention.

What is claimed is:

1. A rear-wheel steering control apparatus comprising:
a vehicle data collection unit configured to receive vehicle data including at least one of steering angle data, steering torque data, vehicle speed data, yaw rate data, and lateral acceleration data;
a vehicle data determination unit configured to determine whether or not the steering angle data included in the vehicle data is normal; and
a rear-wheel steering control unit configured to generate a rear-wheel steering control signal for degradation rear-wheel control based on at least one of the steering torque data, the vehicle speed data, the yaw rate data, or the lateral acceleration data when the steering angle data is determined to be abnormal.

2. The rear-wheel steering control apparatus according to claim 1, wherein the vehicle data determination unit further determines whether or not the steering torque data is normal, and
wherein the rear-wheel steering control unit generates a rear-wheel control signal for the degradation control based on the steering torque data when the steering torque data is determined to be normal.

3. The rear-wheel steering control apparatus according to claim 1, wherein the degradation rear-wheel control is yaw-damping control for attenuating a yaw rate change or yaw-boosting control for increasing a yaw rate change.

4. The rear-wheel steering control apparatus according to claim 1, wherein the rear-wheel steering control unit generates a rear-wheel steering control signal for increasing a yaw rate change when an amount of change in the steering torque included in the steering torque data is greater than a predetermined amount of change in the steering torque.

5. The rear-wheel steering control apparatus according to claim 1, wherein the rear-wheel steering control unit generates a rear-wheel steering control signal for attenuating a yaw rate change when the amount of yaw rate change included in the yaw rate data is greater than a predetermined amount of yaw rate change.

6. The rear-wheel steering control apparatus according to claim 1, wherein the rear-wheel steering control unit generates the rear-wheel control signal including a rear-wheel steering direction that is determined in the same phase or a reverse phase with respect to front wheels based on a vehicle speed included in the vehicle speed data.

7. A rear-wheel steering control method comprising:
receiving vehicle data including at least one of steering angle data, steering torque data, vehicle speed data, yaw rate data, or lateral acceleration data;
determining whether or not the steering angle data included in the vehicle data is normal; and
generating a rear-wheel steering control signal for degradation rear-wheel control based on at least one of the steering torque data, the vehicle speed data, the yaw rate data, or the lateral acceleration data when the steering angle data is determined to be abnormal.

8. The rear-wheel steering control method according to claim 7, further comprising determining whether or not the steering torque data of the vehicle data is normal, wherein the generating of a rear-wheel steering control signal comprises generating a rear-wheel control signal for the degradation control based on the steering torque data when the steering torque data is determined to be normal.

9. The rear-wheel steering control method according to claim 7, wherein the degradation rear-wheel control is yaw-damping control for attenuating a yaw rate change or yaw-boosting control for increasing a yaw rate change.

10. The rear-wheel steering control method according to claim 7, wherein the generating of a rear-wheel steering control signal comprises generating a rear-wheel steering control signal for increasing a yaw rate change when an amount of change in the steering torque included in the steering torque data is greater than a predetermined amount of change in the steering torque.

11. The rear-wheel steering control method according to claim 7, wherein the generating of a rear-wheel steering control signal comprises generating a rear-wheel steering control signal for attenuating a yaw rate change when an amount of yaw rate change included in the yaw rate data is greater than a predetermined amount of yaw rate change.

12. The rear-wheel steering control method according to claim 7, wherein the generating of a rear-wheel steering control signal comprises generating a rear-wheel control signal including a rear-wheel steering direction that is determined in the same phase or a reverse phase with respect to front wheels based on a vehicle speed included in the vehicle speed data.

* * * * *